Dec. 1, 1964  G. C. F. ASKER ETAL  3,159,450
CATALYTIC REACTOR AND METHOD FOR CONTROLLING
TEMPERATURE OF THE CATALYST BED THEREIN
Original Filed Feb. 11, 1958  4 Sheets-Sheet 1
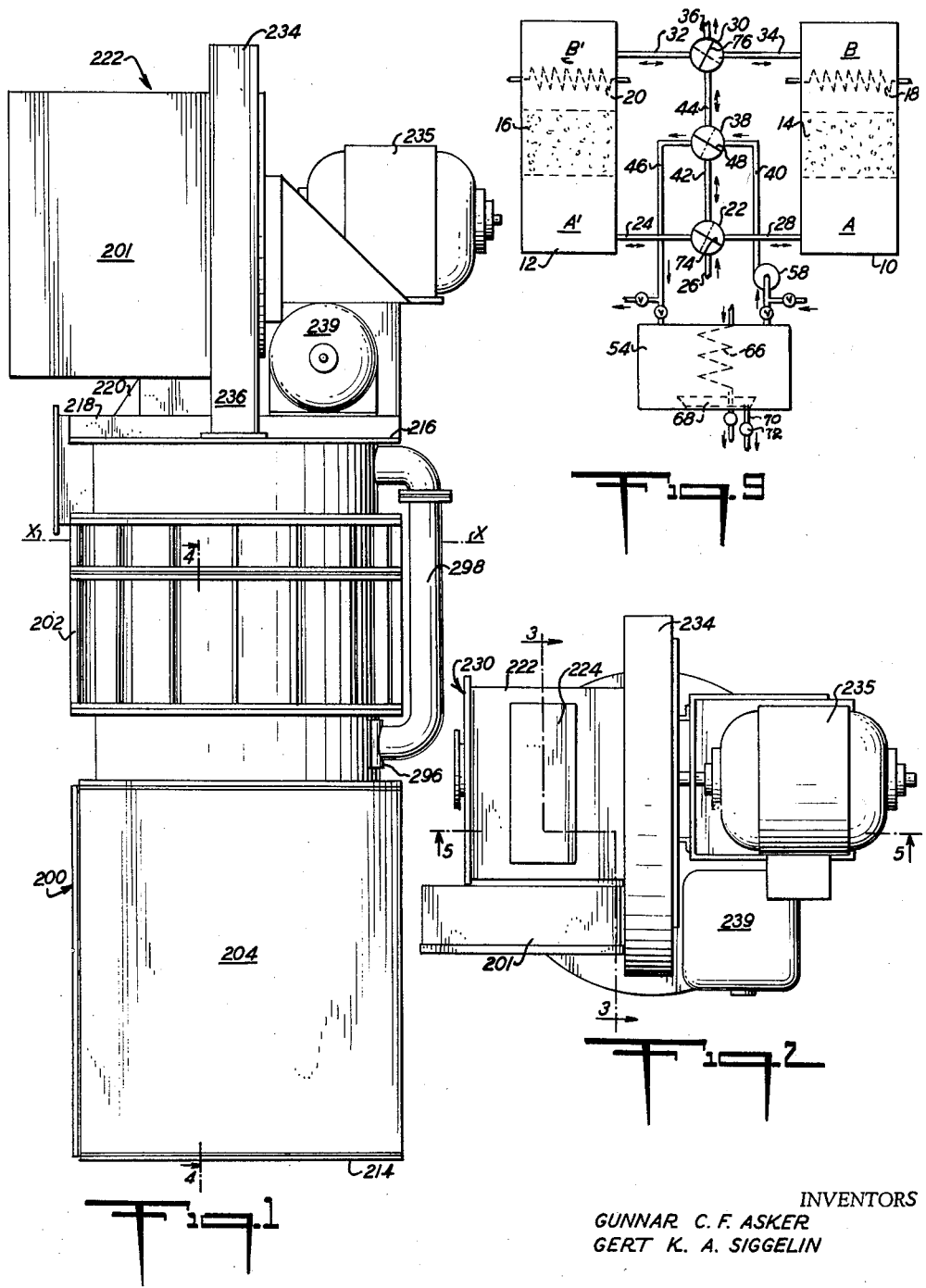
INVENTORS
GUNNAR C. F. ASKER
GERT K. A. SIGGELIN
BY
ATTORNEY

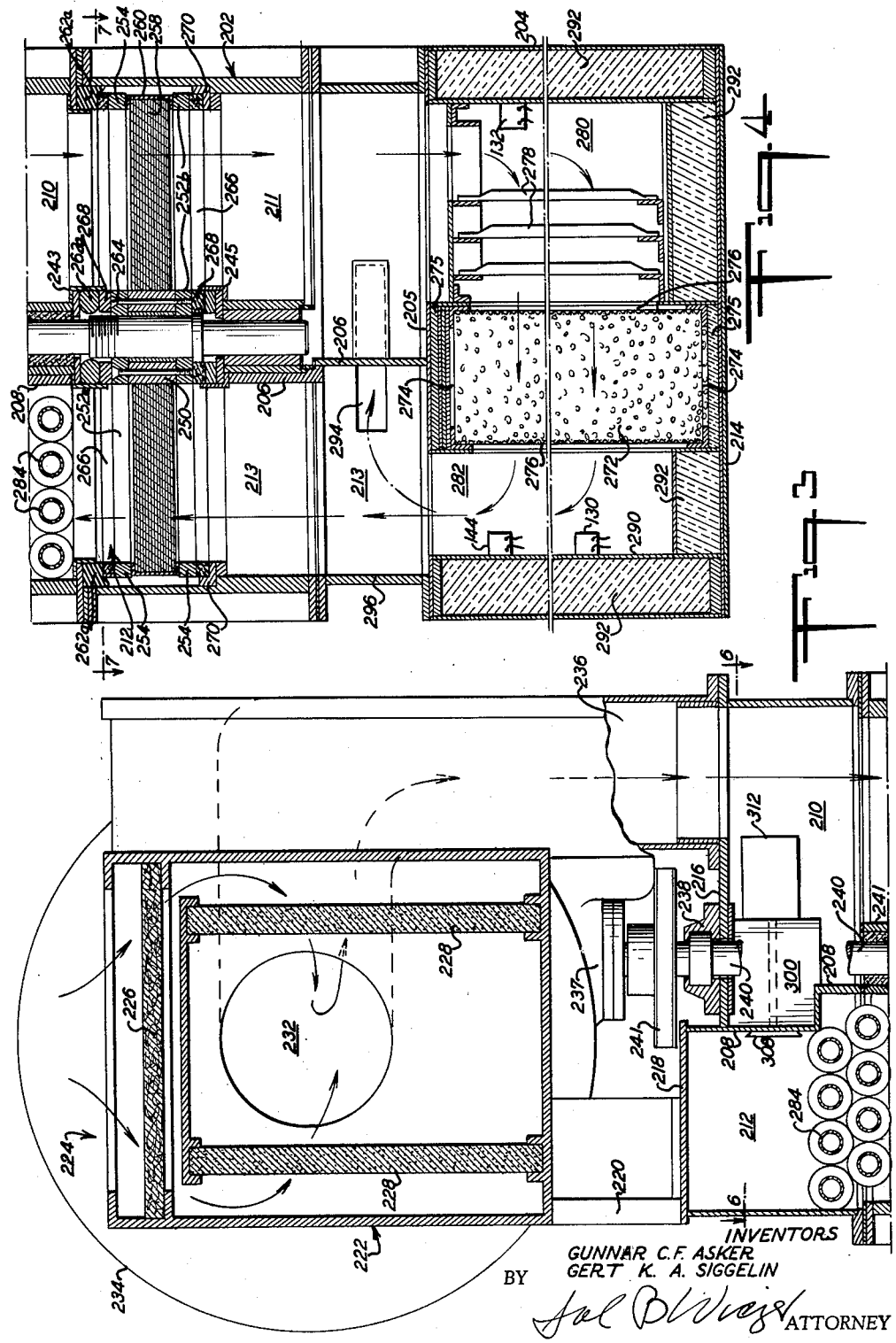

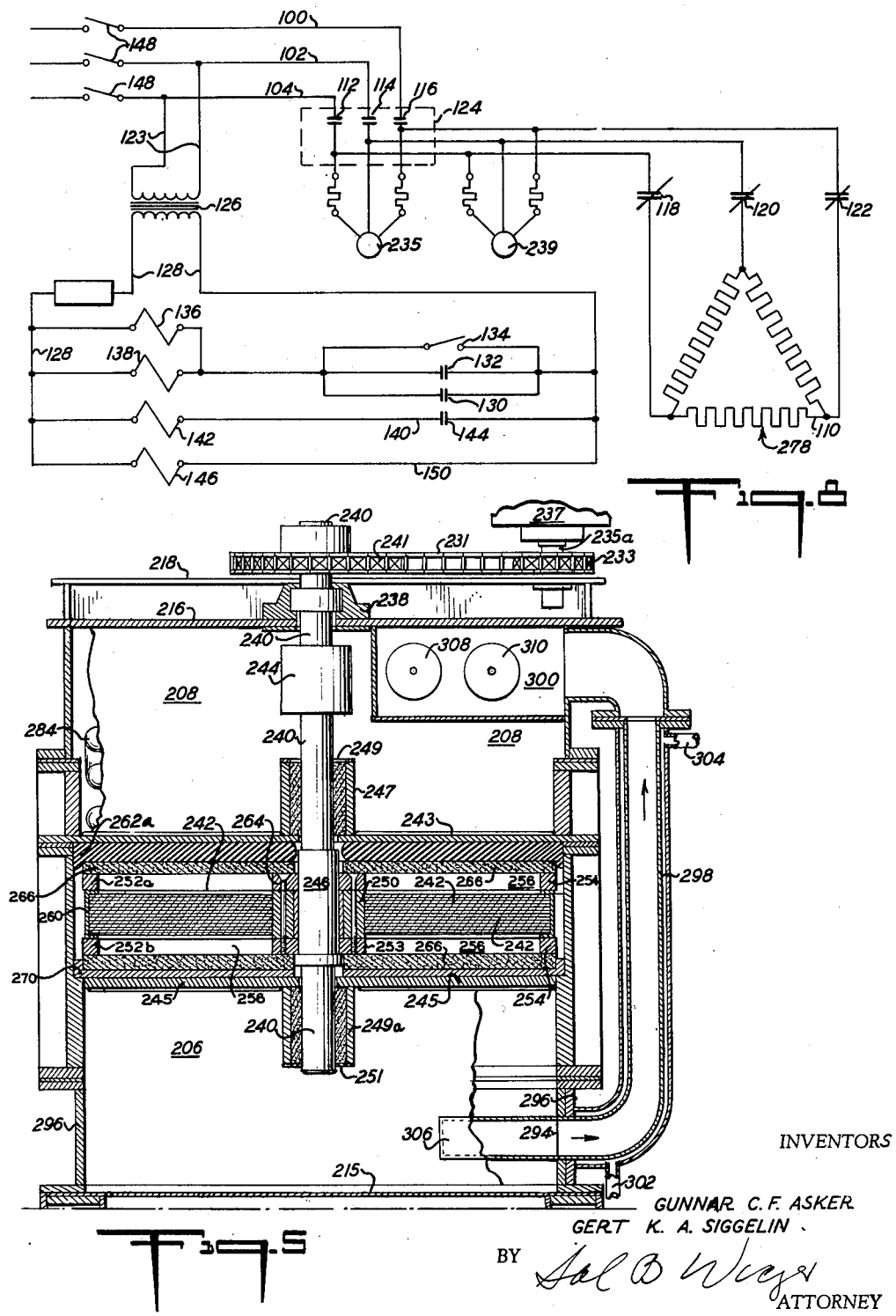

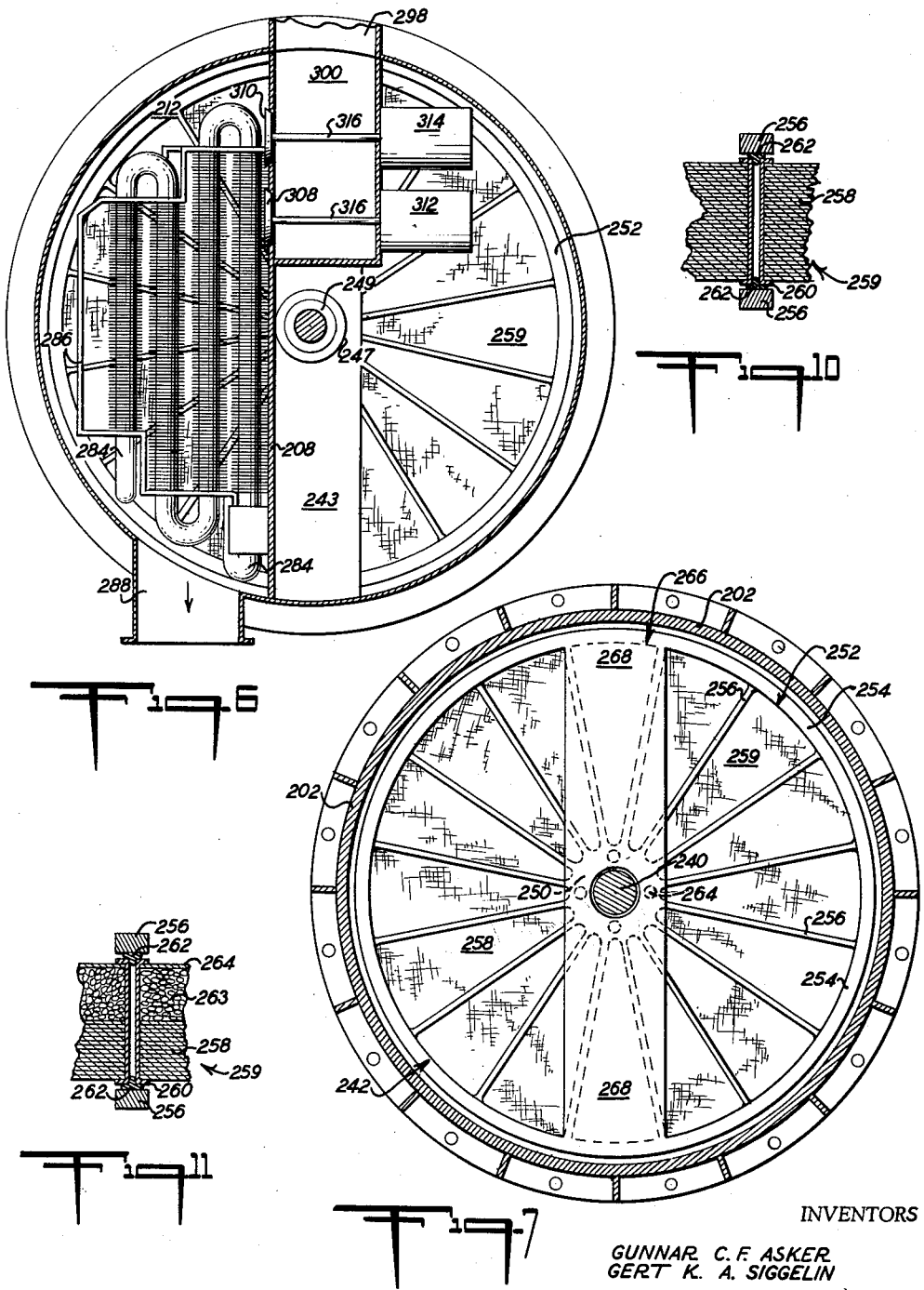

United States Patent Office 3,159,450
Patented Dec. 1, 1964

3,159,450
CATALYTIC REACTOR AND METHOD FOR CONTROLLING TEMPERATURE OF THE CATALYST BED THEREIN
Gunnar C. F. Asker, Princeton, N.J., and Gert K. A. Siggelin, Falls Church, Va., assignors, by mesne assignments, to Atlantic Research Corporation, Fairfax County, Va., a corporation of Virginia
Continuation of application Ser. No. 714,588, Feb. 11, 1958. This application Nov. 29, 1962, Ser. No. 242,039
20 Claims. (Cl. 23—1)

This invention, which is a continuation of copending application Serial No. 714,588, filed February 11, 1958, now abandoned, relates to an improved catalytic reactor and method of operating a catalytic reactor for optimum heat economy and reaction control.

In broader aspect the invention provides a catalytic reactor comprising a bed of catalyst maintained at a critically high temperature range for gas or vapor phase reaction, the reactor being provided with a rotary gas and vapor contact device adapted to intercept the influent and at least a portion of the effluent gas passing to and from the catalytic bed. The rotary contact is operative as a controlled heat exchanger for maximum heat economy to abstract heat from effluent gas and vapors using a controlled quantity thereof to heat the incoming gases or vapors passing through the reactor to modify both the temperature of the incoming gas and the catalyst bed. That rotary contact device in a modified structure is useful to absorb some of the incoming vapors and be regenerated by effluent gas.

The device further includes direct gas heating means whereby to further closely control the temperature of the influent gas, or vapors and bed in a desired temperature range for optimum reaction of the gaseous or vaporized components passing therethrough.

The invention further provides other means for modifying the composition of the gas passing to or from the catalyst bed, such as addition or abstraction of water vapor therefrom as an adsorbent bed of material or such device may merely comprise a heat exchanger of the adsorbent type.

The device provides means for by-passing a controlled quantity of hot effluent gases or vapors around a rotary heat exchanger in combination with additional means to heat said gas and vapors. Thus, the amount of heat exchanged in a rotary type heat exchanger combined with extraneous heat supplied becomes closely controlled for purposes of preheating incoming gas to reaction temperature as it passes to a catalyst bed; and where the reaction is exothermic, prevents overheating of the catalyst bed, controlling its temperature for many types of reaction to a critical degree.

The device further provides means for cooling gases and vapors leaving the rotary heat exchanger for purposes of normalizing the temperature thereof for immediate use; or for purposes of reducing the dew point of such gases by reducing its vaporized liquid content; or even to withdraw further quantities of vaporized liquid suspended in the gas for recovery purposes.

Primarily the invention is useful to purify air and similar gases to catalytically remove or convert undesirable components in the air, such as hydrogen or carbon monoxide to non-poisonous or innocuous components to thereby condition the air for improved breathing thereof by humans in confined spaces, such as in submarines, tunnels, confined shelter areas, sealed aircraft and the like. However, it will be apparent that this device is useful for any type of catalytic reaction performed upon a normally gaseous or vaporized liquid medium reactable at raised and desirably controlled temperature in passage through a catalytic bed, or reaction chamber having solid catalyst or contact elements therein upon or in which a reaction takes place.

Accordingly, one object of this invention is to provide a catalyst bed with a rotary type heat exchanger for transfer of heat from outgoing to incoming gas with means to by-pass a portion of the outgoing gas whereby to control the quantity of heat exchange and thereby the temperature of the bed.

A further object is to use a rotary heat exchanger to modify the composition of the gases entering and leaving the catalyst chamber, and using the heat cycle of a rotary heat exchanger to control the adsorption and regeneration of such rotary mounted bed.

A further object is to combine a rotary heat exchanger operated catalyst bed with a gas adsorbent to modify the incoming gas or the outgoing gas with respect to its vapor content, both or either.

A further object is a method to purify air and/or other gases by passing the same over a catalytic bed at a carefully controlled temperature to effect the reaction with optimum power and heat exchange requirements.

Other objects will be inherent in the description which follows which is made in conjunction with the drawings wherein:

FIG. 1 is an elevational view of the assembled apparatus;

FIG. 2 is a top plan view of FIG. 1;

FIG. 3 is an elevation in section of the upper portion of FIG. 1 taken on the line 3—3 of FIG. 2 down to the level of the line X of FIG. 1;

FIG. 4 is a continuing lower half in elevation of the apparatus taken on the line 4—4 of FIG. 1 continuing downward from the line X of FIG. 1;

FIG. 5 is an end view containing parts of the lower portion of FIG. 3 and upper portion of FIG. 4 in the plane 5—5 of FIG. 2;

FIG. 6 is a section in plan taken through the plane 6—6 of FIG. 3;

FIG. 7 is a section in plan taken in the plane of rotary heat exchanger 7—7 of FIG. 4;

FIG. 8 is a wiring diagram for the system illustrating the operation of electrical elements;

FIG. 9 is a duplex dehumidifier system;

FIG. 10 is a detail illustrating the assembly of contiguous heat exchanger sections; and FIG. 11 is a similar section illustrating assembly of contiguous heat exchanger sections modified for operation with granular desiccant.

FIG. 1 shows an elevation of a generally cylindrical catalytic reactor 200 which comprises a rotary heat exchange unit 202 mounted above a catalyst bed section 204.

As seen in FIG. 5, the device has a lower vertical partitioning wall 206 extending between the top of the catalyst bed section 204 and the lower end of the heat exchanger section 202. The partitioning wall 206 runs parallel to the plane of the drawing of both FIGS. 1 and 5, and normal to the plane of FIG. 4 subdividing the intermediate cylindrical chamber between the top of the catalyst bed 215 and bottom of the heat exchange section 202 into two halves. Similarly, an upper vertical partitioning wall 208 above and parallel to partition 206 best seen in elevation and plan in FIGS. 5 and 6 and also seen in end view in FIGS. 3 and 4, subdivides the upper plenum above the heat exchanger section into two halves comprising an air inlet chamber section 210 and an air outlet section 212 best seen in FIG. 3.

The cylindrical reactor is closed at the bottom by a lower annular plate 214 and at the top by a plate 216, a portion of which 218 is offset vertically for support of an inlet filter section 222 as will appear.

Supported above the raised top portion 218 upon a bracket 220 is an inlet filter box 222 which, as best seen in FIGS. 2 and 3, is a rectangular box closed on all sides except for an open slotted portion 224 on the top through which gas to be treated enters the system. The entering gas passes first through a dust filter 226 comprising a loosely matted layer of fiber, and then, following the arrows as shown in FIG. 3, passes along two outer sides of porous plates 228. These plates 228 are preferably of active carbon or other active adsorbent material, which is usedful to adsorb some gases, which may be desirably removed at this point by adsorption, such as small quantities of hydrocarbon gases. Any other fine filtering or preferably adsorbent integral plate body may be substituted for the carbon plates 228. As shown in FIG. 2, the air inlet box 222 is closed by a forward plate wall 230 which is bolted thereto and which may be removed for purposes of replacing the adsorbent plates 228 from time to time as their adsorbent activity becomes reduced. The gas after passing through the adsorber plates 228 to the central space of the box 222 then enters the suction opening 232 at about the center of a fan or blower (not shown) but which is mounted in the annular housing 234 and driven by an electric motor 235. Gas is passed thereby into outlet duct 236 from which the gas enters the inlet plenum chamber 210.

Suspended in an upper bearing such as a thrust bearing 238 mounted upon top plate 216 for rotation about a vertical axis, is a vertical spindle shaft 240 on which is mounted for rotation therewith, the rotary heat exchanger assembly 242.

The assembled heat exchanger 242 is mounted between metal cross members comprising an upper channel bracket 243 formed of separate side angle irons welded to a central plate, having its angle side flanges turned downward, an a lower channel 245 having its side flanges turned upward as shown in end section of FIG. 4. Both channels 243 and 245 extend diametrically through the center from side to side of the cylindrical heat exchange section 202, as seen in side elevation in FIG. 5, and are fastened in diametrically opposite sides to the cylindrical casing wall. Centrally secured by welding above the upper channel 243 is a cylindrical bearing housing 247, the housing having a sleeve bearing 249 supported therein which slideably fits about the shaft 240 for vertical frictionless support of the shaft above the cross member 243, and a similar cylindrical bearing housing 249a having a bearing 251 is secured about the lower end of the spindle shaft 240. The combined bearings rotably support shaft 240 and heat exchange elements thereabout in rotary position about its vertical axis. Intermediate the upper and lower portions of shaft 240 is a wide diameter hub portion 246 onto which the heat exchanger is mounted. The vertical adjustment of the shaft 240 is further effected by a coupling member 244.

The upper end of the shaft 240 extending above the bearing 238 has a large ring gear 241 keyed thereto for rotary drive. For completion of that drive a motor 239, having a right angle gear reduction portion 237, is mounted to the top of the casing 216 and has its speed reduced drive shaft 235a extending vertically downward therefrom upon which is mounted a spur gear 233. A chain drive 231 is entrained thereabout interconnecting that spur gear 233 with the ring gear 241 for rotation of the drive shaft 240 and heat exchanger 242 mounted thereabout.

The rotary heat exchanger proper is shown in elevation of FIGS. 4 and 5 and in plan in FIG. 7.

As seen in the plan view of FIG. 7 the cylindrical heat exchanger portion of the casing 202 has the heat exchanger body 242 concentrically mounted for rotation about rotor shaft 240. About the enlarged hub supporting portion 246 of shaft 240 is tightly fitted an inner sleeve and press-fitted hub thereon 250, to which is bolted upper and lower wheels 252. The wheels 252 comprise a peripheral felly 254 and radial spokes 256 integrally joining the felly with a hub portion 250.

As shown in the detailed FIG. 10 the heat exchanger proper comprises in preferred construction a substantial number of metallic screens 258 assembled in a tier, the assembly comprising a wedge-shaped section 259 filling the area between radially adjacent spokes 256 as viewed in plan of FIG. 7. These screens 258 are assembled in a tier 259 to extend from the lower wheel 252b to the upper wheel 252a. All of the screens 258 of the tire 259 are bound together at their edges by solid channel iron sheets 260. The channel iron sheets 260 of each assembled wedge-shaped sector 259 lie contiguous to the next sector 259 and are imperforate so that the porosity provided by the screens 258 of each sector 259 extends only vertically from top to bottom thereby to allow gas to pass vertically therethrough, but since the channels are themselves imperforate, the gas cannot pass horizontally between adjacent sectors. The space between each sector 259 is sealed by large strip resilient gaskets 262 which are pressed down between each adjacent heat exchange sector by a spoke 256 of each upper and lower wheel 252. The wheels 252 are bolted together at the hub by long bolts 264, as seen in FIGS. 4 and 5, compressing the sealing elements 262 against the bonding angle irons 260 of each sector thereby sealing the edge and vertical spaces therebetween against vertical gas passage between sectors, constraining the flow of gas to the porous center portion of each sector. As shown in this embodiment the heat exchange material may be metal screen, but it could equally be formed of porous ceramic ware having metal particles embedded therein for high heat capacity.

The assembled and upper and lower wheels 252a and 252b are confined between graphite sealing members 266 which comprise an annular ring as shown in FIG. 7, having a corresponding felly portion immediately superimposed above the upper and beneath the lower fellies 254 of the wheels, the graphite ring having a wide flat central sealing portion 268 diametrically extending from side to side of the graphite felly. That central sealing portion 268 is wider than a sector 259 between spokes of a wheel to extend on both sides beyond a full heat exchange sector. Thereby the central sealing portion 268 acts as a seal to prevent gas exchange in substantial volume between the left and right heat exchanger portions on opposite horizontal sides of the seal, as shown in FIG. 7.

These graphite seals 266 as seen in FIGS. 4 and 5 are resiliently pressed against the upper and lower wheel portions 252 in sliding sealing contact therewith by resilient gasketing upper 262a and lower 270 sealing members. These resilient and graphite seals are supported through the center by metal cross members 243 above and 245 below, the cross members being of approximately the same width as the wide central graphite seal portion 268 and thereby reinforces and completes the assembly.

The upper partitioning element 208 is fastened at its lower edge to the upper cross member 243 near one side thereof, rising vertically to fasten as by bolting or welding to the top member 216 and to diametrically opposite sides of the cylindrical plenum section separating that plenum section into inlet plenum 210 and outlet plenum 212 as viewed from FIG. 3. The lower vertical partitioning element 206 similarly subdivides the lower plenum into inlet portion 211 and outlet portion 213 before re-entering the heat exchanger. The lower partition 206 similarly fastens at the top to the cross member 245 and at the bottom to the top of the catalytic unit 215 and then at diametrically opposite sides of the cylindrical unit. Thus, both partitioning walls serve to divide the heat exchange unit into two halves.

In operation of the heat exchanger of this construction, the gas or vapor, as viewed in FIG. 4, passes downward through the upper inlet plenum half 210, passing down through the heat exchanger screens in the right hand half into the catalytic section 204 having an inlet heater ante-chamber portion 280, thence through the catalyst bed 272 and then upward, by way of plenum chamber 213, through the other half of the heat exchanger 242. During gas passage, the heat exchanger is continuously slowly rotated by motor 239, the two halves of the chamber, as separated by partitions 206 and 208, remaining sealed by the graphite seals resiliently bearing from above and below against wheels 252 so that hot gas continuously warms the left hand portion of heat exchanger 242 in passage upward and incoming gas continuously cools heat exchanger screens in the right hand portion as it becomes heated and passes downward to the catalyst chamber.

The catalyst chamber 204 is centrally divided from one side to the other by a bed of catalytic material 272 which is disposed in box-like chamber having top and bottom 274 sealed by insulating material 275 and sides, the larger open central area of which is covered by catalyst retaining screens 276.

On the inlet side of the catalyst chamber is mounted several electrical heating elements 278 such as standard electrical resistor bar construction. Thus, the influent gas preheated by contact with exchanger 242, passing downward through plenum 211, is further heated by electrical heaters 278 in chamber 280 and passes as accurately preheated gas through the catalyst bed 272 in the direction of the arrows, and thence passes outward from the catalyst into chamber 282 and upward into chamber 213. It will be noted that the gas enters from one side of partition 206 and leaves through the opposite side of the partition 206 which maintains inlet and outlet gases separated.

A bank of cooling tubes 284 through which water or other refrigerating gas or liquid medium may be circulated to have optimum heat exchange is mounted in the outlet plenum 212. The tubes 284 may be of the fin coil type as shown in detail in FIG. 6. The fin coil tubes 284 are supported in plenum 212 by a bracketing element 286. The effluent gas may pass directly upward from hot plenum 213 through the hot side of the exchanger 242, thence into outlet plenum 212 where the gas will contact the cooling coils 284 for such further cooling as is desired, before passing out of the unit through outlet duct 288.

For purposes of close temperature control the outer catalyst section 204 walls may be double walls, comprising inner walls 290, and the space between the inner and outer walls may be filled with fibrous insulating material 292, as seen in FIG. 4. The construction as described prevents heat losses in the catalyst chamber, allowing further accurate control of the temperature of the catalyst bed in normal operation. Further heating of the inlet gas to close temperature control is produced by heating elements 278 which the gas contacts before entering the catalyst bed. A large portion of that heat after passing the catalyst bed may be recovered in the left hand portion of the heat exchanger 242 from the gas passing upward from the chamber 213. By the construction thus far described that continuous heat recycle would progressively raise the temperature of the inlet gas.

In order to make the system quite flexible to maintain the catalyst chamber at a constant temperature without progressive rise, a controlled quantity of heat is supplied by heater 278 as described below, and by controlled heat exchanger of gases. For this purpose a portion, up to about ½ of the hot gases or more, as desired, may be by-passed through outlet opening 294. That outlet opening 294 is cut in the cylindrical wall portion 296 as seen in FIG. 1 and is preferably proportioned to allow about ½ of the outlet gases in chamber 213, taking into consideration the back pressure encountered at the left hand portion of the heat exchanger 242, to normally flow outward at that point and into by-pass duct 298, passing the gas from that by-pass duct 298 into cooling chamber 212 by way of valve chamber 300. The by-pass 298, as shown in FIG. 5, may be jacketed and a cooling fluid passed through the jacket entering through duct 302 and leaving through duct 304 thereby cooling gases passing through the by-pass duct 298 as desired. The by-pass opening 294 has a cup-like portion 306 surrounding the cut in the partitioning wall 206 for enlarged intake of gases from the chamber 213 side thereof. The by-pass gas entering valve box 300 will pass to outlet chamber 212 as one or both of the valves 308 and 310 are opened by their respective solenoids 312 and 314 respectively. The solenoids 312 and 314 are conventional spring tensioned solenoids, and their armatures extend integrally through valve stems 316, which are biased closed by springs (not shown) to cause the valve heads 308 and 310 to be tensioned to closed position upon their seats in the partitioning wall 208 which forms one wall of the valve chamber 300. Thus, valves 308 and 310 are normally tensioned closed by springs (not shown), and upon electrical actuation of solenoids 312 and 314, or either, will open by movement of the solenoid armatures.

Thus, hot effluent gas in chamber 213 will pass into by-pass duct 298 by-passing about 25% of the hot gas, more or less, when one of the valves is open, and up to about 50%, more or less, when both of the solenoid controlled valves 308 and 310 are open. Whether hot gas in chamber 213 passes upward through heat exchanger 242 or through the by-pass duct, both streams of gas are recombined in outlet chamber 212, are cooled to a desired outlet temperature by the cooling coils 284 and thence is passed outward through duct 288.

FIG. 8 illustrates the wiring diagram for operation of the unit. As there illustrated a typical three phase 60 cycle source of current is led through three lines 100, 102 and 104 at a high voltage such as 220–600 volts, depending upon the power requirements, supplying current in parallel to the fan motor 235, the gear motor 239 for rotating the heat exchanger 242 and to the electrical heater unit assembly 278, illustrated by diagrammatic wires 110. Each lead line is controlled by switch contacts 112, 114 and 116 normally open to supply current to the fan and gear motors, and switch contacts 118, 120 and 122 normally closed to supply current to the heater 110. These may be mounted on a single control panel 124 (shown diagrammatically in the dotted area) for simultaneous operation of switches or may be operated independently one at a time as here shown for switches 118, 120 and 122. Those on control panel 124 may alternatively be made for independent operation and those shown for independent operation, 118, 120 and 122, may be mounted similarly on a control panel for simultaneous operation, any arrangement for independent or combined operation being usefully used as desired. However, if the independent switches 118, 120 and 122 were combined for simultaneous operation on a single control panel the power input to the heater elements 110 could be reduced to 50%, simultaneously increasing the complexity of the circuit by necessary use of additional thermo-controlling switches with, however, the substantial reduction of the power input to the heater.

The temperature and switch controls are illustrated in the remaining portions of the circuit. For this purpose power is taken by way of line 123 through a step-down transformer 126 which steps-down the voltage to a lower values such as 110 volts passed through line 128. Other useful mounting of thermo-switches for accurate temperature control than the arrangement here shown is possible, but as here illustrated, a thermo-switch 130 is mounted in parallel with a thermo-switch 132, and a manually operated switch 134 which draws current from line 128 for control of two solenoids 136 and 138. Of the solenoids, 136 comprises the solenoid 312 which actuates by-pass valve 308 and the other, 138, opens the normally closed heater switches 118, 120 and 122 as a group. The switches 130, 132 and 134 are normally open so that by closing any of them completing the circuit through line 128, solenoids 136 and 138 will be simultaneously actuated. This may be either by manual closing of switch 134, or by thermostatically closing switch 132, for example, set at a temperature about or slightly exceeding 600° F. actuating that switch as a thermostatically controlled switch, or by closing switch 130 thermostatically actuated at a preset temperature, for example, a temperature exceeding 625° F.

The switch 132 preset for closing at about 600° F. is energized by the temperature of the catalyst bed 272 and on an inlet side it will de-energize the heater if for any reason the inlet side of the system is at a temperature exceeding the preset temperature of 600° F. Simultaneously one by-pass valve 308 is opened. However, with the system and the inlet temperature below 600° F., the catalytic reaction in the bed may raise the temperature of the bed too high, so also for that reason it is desired to cut down the preliminary heat then switch 130 sensitive to the temperature on the effluent side of the bed and set at 625° F. becomes actuated and it breaks the circuit to the heaters 110. Finally, by manual operation of switch 134 the heater may be cut off. Thus, in alternate operation, switches 130, 132 and 134 are low temperature or manual controls upon the heater 110 (278); and some by-pass of the exchanger 242 takes place with the opening of valve 308, and the heater 278 is therefore cut off either by an inlet temperature exceeding 600° F., when the catalyst bed or outlet gas becomes too high exceeding 625° F., or by manual operation.

An extra circuit leg, operating through line 140 and completed through and controlling solenoid 142, which corresponds to solenoid 314, completes the circuit through line 140, and thereby opens the second by-pass valve 310 and increases the volume of by-passed gas when the open thermostatically controlled switch 144 of the outlet side of the bed 272 exceeds some maximum safety temperature of, for example, 675° F.

The main switches 112, 114 and 116, as shown, are normally open. These are closed by a solenoid 146 which is actuated immediately to close these contacts when the main manual power line switch 148 is closed, thereby completing the circuit through transformer 126, line 128 and line 150 to actuate solenoid 146 and effect that switch closing.

The electrical panel 124 and several manual and some automatic switches, solenoids, etc., may be mounted in any suitably mounted control box 201.

In operation with electrical controls, as thus described, closing of main switch 148 will start the heater, the fan motor, and gear motor to rotate the heat exchanger. The inlet gas to the bed and the bed itself will then be heated by the heating elements 278, any exothermic heat evolved by chemical reaction of gases in the bed and by heat exchange with heat transferred in rotation of the heat exchanger 242 as it is heated in contact with effluent gases passing up through the screens 253 from hot plenum 213 and transferred in rotation of the screens to the opposite side for contact with incoming gases from plenum 210. As the bed remains at temperatures below 600° F., for example, all of switches 130, 132, 144 and usually 134 will be open whereby both valves 308 and 310 will be closed. When about 600° F. is reached only switch 132 will be thermostatically closed, simultaneously actuating solenoids 136 and 138, whereby valve 308 will open and heaters 278 will be inactivated. This will reduce the heat supplied to the inlet gas only to that obtained from the exchanger 242, and part of the effluent hot gas will be by-passed around the heat exchanger through open valve 308. If for some reason the temperature of the inlet gas is below 600° F., but nevertheless the effluent gas exceeds 625° F., the heaters will also be cut off by thermostatic actuation of switch 130 on the effluent side of the bed. Thus between switch 130 and 132 the actual temperature rise produced by the reaction taking place in the catalyst bed itself is accommodated to prevent overheating thereof. Finally the switch 144 is cumulative to prevent dangerous overheating of the system by opening a second valve 310 to by-pass greater quantities of gas around the exchanger, that switch 144 being thermostatically set at some maximum safety temperature of the system, for example, 675° F. It will be understood that the temperatures mentioned are merely examples and such may vary with different catalysts and gases to whatever is optimum for the system.

Again, sometimes where larger quantities of such gases are to be removed from the main body of gas, relatively large quantities of water vapor are formed in the reaction product which are desirably removed therefrom. In that event, the cool effluent gas is also desirably passed through a dehumidifier. It will be noted, however, that substantial dehumidification of this gas may be effected in any case by operating the cooling coil tube 284 at a low enough temperature thereby to reduce the moisture content of the gas in cooling contact therewith to a desirably low dew point. Any condensed water is collected in channel iron drip pans (not shown) and withdrawn from time to time from the cooling chamber through a duct (not shown) in a manner analogous to that shown in FIG. 9.

However, it is often preferred practice to finally dry the effluent gas by passing the same through an adsorbent desiccant type dehumidifier. Since the gas finally to be dehumidified following catalytic treatment is cooled in contact with the cooling coils 284 in any case, before passing to the dehumidifier, both types of dehumidification may be imparted to the gas, that is, first cooling it in contact with the tube 284 to partially remove some of the moisture, cooling the gas in the process, and then passing the cold partially dehumidified gas through an adsorbent type dehumidifier. Following that practice, the final dehumidification is most efficient.

A useful dehumidifying unit either for dehumidifying the gas before passing to the reactor or for dehumidifying the gas after passing through the reactor, is illustrated in FIG. 9.

The FIG. 9 illustrates a dehumidifier of a co-pending application Serial No. 674,207, filed July 25, 1957, now abandoned and refiled as Serial No. 43,268 on July 11, 1960, and shows diagrammatically and in elevation both a suitable dehumidification apparatus and the dehumidification process to apply dehumidification before catalytic treatment of the gas, or to apply dehumidification after catalytic treatment.

As shown therein, two cylindrical housings 10 and 12 respectively have beds of desiccant material 14 and 16 centrally supported between upper and lower plenums A and B, and A' and B' respectively. Electrical heater elements 18 and 20 are mounted in each plenum B and B' above beds.

Typical 4-way valves controlled by a rotating vane for alternately interconnecting the 4-ways of each valve into two pairs, as well known in the art, are mounted to control the flow of gas into, out of and between the dehumidifier housings 10 and 12. For this purpose a lower 4-way valve 22 is mounted for interconnecting lower duct 24 with inlet duct 26 and duct 28 with duct 42 in the full position of the valve vane 74. In this position gas to be dehumidified enters through duct 26 and passes to the lower plenum A' of unit 12 through duct 24. Simultaneously, moisture laden scavenging gas leaves plenum A through duct 28 and passes to outlet duct 42 for reconditioning.

When valve vane 74 is rotated to dotted line position the flow direction is reversed, inlet gas from duct 26 then passing by way of duct 28 to plenum A and scavenging gas from plenum A' is led by way of duct 24 through duct 42. Similarly, an upper 4-way valve 30 of the same type is mounted to control the passage of gas into and out of upper plenum chambers B' and B, the valve vane 76 interconnecting, in the full line position as shown, dehumidified gas in plenum B' with the dry gas outlet 36 by way of duct 32; and interconnecting inlet scavenging gas from duct 44 with the plenum B by way of duct 34. In the dotted line position of the vane 76 the flow is reversed; dehumidified gas then flows out of plenum B through duct 36 by way of duct 34, and scavenging gas enters plenum B' from duct 44 by way of duct 32.

Mounted intermediate between lower valve 22 and upper valve 30 is a regenerating gas control valve 38 of the same 4-way type. That valve 38 in the full line position of vane 48 interconnects inlet regeneration gas passing through inlet duct 40, with continuing inlet duct 44, by which the valve 38 communicates with the valve 30 on one side. The valve 38 further interconnects regeneration waste outlet gas passing through duct 46 with duct 42 by which valve 38 communicates with the valve 22.

In the dotted line position of rotor 48 the outlet 46 then interconnects with duct 44 and inlet 40 with duct 42. Thus the valve 38 interconnects the several ducts 42 and 44 serving as inlet or outlet depending on the position of the rotor vane 48, as shown. Since ducts 42 and 44 as inlet and outlet scavenging gas ducts connect with the inlet and outlet ducts of all plenums by way of 4-way valves 30 and 22, the direction of flow of scavenging gas is ultimately flexible to pass to or from either side of either bed.

The outlet duct 46 communicates with a refrigerating chamber in a tank 54. Similarly, regenerating gas passing through duct 40 as impelled by a fan or blower is obtained as cold relatively dry recycled gas from refrigerating chamber 54. In the refrigerating chamber 54 a refrigerating coil 66 is mounted connected to a source of cooling fluid (not shown) circulated therethrough as shown by the arrows to maintain the surface of refrigerating coil 66 cold, and thereby cool and dry regenerating gas in contact therewith in heat exchange. A drip pan 68 is mounted beneath the coil 66 whereby condensed moisture passing to the bottom of the coil 66 may be withdrawn from time to time through a duct 70 as controlled by a valve 72.

In the simplest form of construction and operation with the vane 74 of the lower valve 22 in the full line position as shown, and the vane 76 of the upper valve 30 in the full line position as shown, gas, such as air, to be dehumidified first enters the duct 26, usually as induced or forced by blower 234. The gas passes thence by way of duct 24 into plenum chamber A' of the left-hand dehumidifying unit 12, and thence upward through bed 16 wherein its moisture is removed by the adsorbent bed of granular desiccant. The dried gas then passes into plenum chamber B', heater unit 20 being inactive, and the gas leaves the plenum B' through duct 32, and thence out of duct 36 as dehumidified dry air or gas.

Simultaneously, the dehumidifier unit 10 is being regenerated. For this purpose, regeneration gas as cold dry gas from refrigeration chamber 54, as impelled by a blower 58 passes through duct 40 and duct 44, the rotor vane 48 of the valve 38, being in the full line position as shown. The regenerating gas passes by way of valve 30 and duct 34 into plenum chamber B of dehumidifier 10. The electrical heater element 18 is activated and heats the regenerating gas. The hot regeneration gas passes downward from plenum B into bed 14, picking up moisture from the desiccant material at its raised temperature, passing thence into plenum A. It then passes out of plenum A through duct 28, traversing duct 42 through opposite side of the vane 48 of valve 38 and then out through duct 46. The hot regenerating gas in duct 46 then enters chamber 54, and is there cooled, dried and recycled. After bed 14 is regenerated heater 18 is inactivated whereby the bed 14 is cooled by the cold regenerating gas, preferably in reverse direction of flow by reversal of vane 48 to dotted line position. After bed 16 is exhausted both vanes 74 and 76 are reversed to dotted line position whereby drying of the gas is effected by bed 14 and bed 16 is regenerated in the same manner as applied to bed 14.

A useful modification of the rotary heat exchanger wherein the heat exchange function is combined with dehumidification is illustrated in detailed FIG. 11. For that purpose, the heat exchange screens 258 are mounted across the bottom of the unit and thereabove, in each sector 259, is mounted moisture adsorbent material 263 such as granular silica gel. The upper portion of each sector has the silica gel confined therein by a single screen 264. The construction of a sector is otherwise the same as described and shown in FIG. 10. Thus, according to the modification of FIG. 11, the rotary exchanger has the lower part comprised of heat exchange screens and the upper part of adsorbent silica gel. In that construction, hot gas passing upward through the heat exchanger from section 213, as viewed in FIG. 4 with the exchanger modified according to FIG. 11, first has the heat thereof transferred in part to the metal screens 258 and then the gas proceeds upward through the silica gel bed 264 of each separate sector 259 and, as the gas is hot, it will expel the moisture from the bed that may have been adsorbed in the inlet section of the unit. The rotary exchanger and silica gel beds therein continuously rotate slowly and, when they enter the inlet section and are contacted with relatively cold inlet gas adsorb moisture therefrom. The inlet gas passing from section 210 and 211 by way of desiccant containing exchanger, is both preheated and dehumidified. Thus, the silica gel bed passing in rotation from one side of the unit to the other, continuously adsorbs moisture and continuously is regenerated during the slow rotary movement of the exchanger dehumidifier structure.

Since the bed of desiccant itself is heated and will transfer heat to the incoming gas the number of heat exchange screens 258 is substantially reduced and may be omitted entirely, leaving only a single bed supporting screen if desired, whereby the bed itself provides all of the heat exchange as well as dehumidification.

Of course, the outlet gas which by the modification of FIG. 11, becomes regeneration gas or scavenging gas by having picked up moisture from the desiccant bed in hot contact therewith, will have disposed of some of its moisture in further contact with cold cooling coils 284 and may be further dehumidified by passage through a dehumidifier as shown in FIG. 9.

As thus described a gas such as air containing trace quantities of components that are desirably removed, for instance, quantities of hydrogen or carbon monoxide or even combustible hydrocarbon gases, drawn into the system comprising the reactor as thus described, may first be filtered of dust, etc., and then subjected to an activated carbon adsorbent for purposes of removing some of the adsorbable gases, for instance, hydrocarbon gases. The gas is then continuously preheated in a rotary heat exchanger thereby recovering much of the heat energy required to catalytically treat the gas from the hot effluent gas and supplying any necessary extra heating from heating elements thereby to provide an apparatus of compact size for these functions, while reducing the energy expenditure of heating and cooling. The gas is preheated most accurately and passed through a catalyst bed for conversion of some of its components by the action of the catalyst in the presence of reactable gas such as the oxygen contained in the air. For instance, the hydrogen therein is oxidized to water and carbon monoxide to carbon dioxide. The apparatus is versatile, moreover, to by-pass a portion of hot gases away from a heat exchanger, thereby preventing the catalyst bed from being progressively overheated above its optimum reaction temperature. That by-pass itself is readily controlled by several valves which progressively and automatically raise the volume of gas allowed to by-pass the heat exchanger as controlled by the actual temperature of influent or effluent gases.

It is often desirable for optimum completion of the catalytic reaction to remove what may be no more than very small quantities of contaminating gases, to first remove small trace quantities of moisture from the gas before the catalytic contact. That removal of moisture before catalytic contact, or even before passing the gas through the catalytic reactor, tends to enhance the efficiency of the reactor. One reason for this is that water is one of the reaction products, and the reaction therefore will drive more nearly to completion as the gases are pre-dried before being catalytically treated.

The following examples illustrate several gas treating processes using this reactor apparatus.

*Example I*

Air containing 1% hydrogen and .02% CO and about .005% methane at a relative humidity of 75% is first dehumidified by passing through a bed of desiccant material as shown in FIG. 9 to reduce the moisture content to a relative humidity of about 20%. It is passed into the apparatus described at a rate of about 225 c.f.m. at a pressure of about 10" W.G. through a rotating heat exchanger at about 10 r.p.m., heated by effluent gases to a temperature of about 500° F. The cold influent gas after passing the heat exchanger is preheated to a temperature of about 360° F., is then further heated by hot electrical heating elements to a temperature of 450° F. and passed through a catalyst bed of hopcalite. The effluent gas, from the bed at a temperature of about 600° F. is returned through the heat exchanged and cooled in contact with water cooled tubes to about 60° F. as it passes out of the unit at about normal ambient temperature. A catalyst bed with that quantity of hydrogen will progressively rise in temperature of about 150–180° F. by the heat of combustion of the hydrogen to water and consequently overheat the bed. Accordingly, shortly after starting operations first one valve will open to by-pass about 25% of the effluent gas around the heat exchanger and simultaneously the electrical heating elements are inactivated, and shortly thereafter the effluent gas having reached 675° F., both valves will open so that half of the effluent gas is by-passed around the exchanger.

The valves will close and the heating element again activated momentarily as the temperature of the bed falls whereby the temperature of the bed will be maintained in the range of 625–675° F. Analysis of the effluent gas shows no analyzable quantity of either hydrogen, carbon monoxide or methane.

*Example II*

In a modification of Example I the gas passed into the unit is not dehumidified but rather only the gas leaving the unit whereby the ultimate gas produced has a final relative humidity lower than about 20%.

*Example III*

In another modification of Example I, the gas as it leaves the unit and without further dehumidification is cooled by the cooling coils to a temperature below 32° F. produced by passing refrigerated brine through the cooling coil 284.

*Example IV*

Contaminated air of 80% relative humidity as in Example I enters the catalytic unit as such, but it is dehumidified by passing it through rotating desiccant bed subdivided in sections and carried as a heat exchanger, as described in FIG. 11. Hot effluent gases from the catalyst bed at 650° F. serve to continuously regenerate the slowly rotating desiccant bed on the hot side of the exchanger and the relatively cold incoming gases become substantially dehumidified to about 20% relative humidity in passing through the rotating heat exchanger on the influent sides, and becomes preliminarily heated about 25° F. The effluent gas containing substantial quantities of moisture are further dehumidified by contact with cooling coils 284 through which refrigerated brine is passed to lower the dew point to about 32° F.

In modified uses of the device herein and substituting different catalyst, it is found that trace quantities of oxygen can be removed from commercial nitrogen by adding stoichiometric quantities of hydrogen thereto for reaction with the oxygen and passing through the bed as described. Other gaseous vaporized liquid reactions can be effected with an accurately temperature controlled catalyst bed in this apparatus by selection of a proper temperature for reaction and known catalytic contact bodies for that reaction. Accordingly, reference herein to "gases" will, in most instances, be understood to include vapors.

Certain modifications will occur to those skilled in the art and it is accordingly intended that the description herein given be regarded as illustrative and not limiting except as defined in the claims appended hereto.

We claim:

1. A catalytic reactor comprising an elongated casing adapted to contain a catalyst body of foraminous material in one end dividing said casing into inlet and outlet sections, means for passing relatively cold influent gas to one side of the said catalyst body for contact therewith, means for withdrawing hot effluent gas from contact with said catalyst body, a heat exchanger for close control of temperatures developed in said body mounted in the opposite end of said casing to rotate heat transfer elements between both said influent and effluent gas passing means to recover sensible heat from hot effluent gas and transfer the same to said influent gas, and means extraneous to the catalyst body for further modifying the temperature of the influent gas to said catalyst body.

2. A catalytic reactor comprising an elongated casing adapted to contain a catalyst body of foraminous material in one end dividing said casing into inlet and outlet sections, means for passing relatively cold influent gas to one side of the said catalyst body for contact therewith, means for withdrawing hot effluent gas from contact with said catalyst body, a heat exchanger for close control of temperatures developed in said body mounted in the opposite end of said casing to rotate heat transfer elements between both said influent and effluent gas passing means to recover sensible heat from hot effluent gas and transfer the same to said influent gas, and means for by-passing a controlled quantity of hot effluent gas around said heat transfer element whereby to transfer only a controlled quantity of heat to said heat transfer elements and to said influent gas from said heat transfer elements.

3. A catalytic reactor comprising an elongated casing adapted to contain a catalyst body of foraminous material in one end dividing said casing into inlet and outlet sections, means for passing relatively cold influent gas to one side of the said catalyst body for contact therewith, means for withdrawing hot effluent gas from contact with said catalyst body, a heat exchanger for close control of temperatures developed in said body mounted in the opposite end of said casing to rotate heat transfer elements between both said influent and effluent gas passing means to recover sensible heat from hot effluent gas and transfer the same to said influent gas, electrical heater element means for supplying additional heat to said influent gas in passage to said catalyst body and means responsive to the temperature of the catalyst body for activating and inactivating said heater element means.

4. A catalytic reactor comprising an elongated casing adapted to contain a catalyst body of foraminous material in one end dividing said casing into inlet and outlet sections, duct means leading relatively cold influent gas to one side of said catalyst body for reactive contact therewith, duct means leading hot effluent gas away from contact with said catalyst body, a heat exchanger for close control of temperatures developed in said body mounted in the opposite end of said casing to rotate heat transfer elements in rotating contact with both said influent and effluent gas passing to and from said catalyst body to recover sensible heat from hot effluent gas and transfer the same to said influent gas, heating means independent of heat available from said catalyst body for further modifying the temperature of the influent gas to said catalyst body, and duct means connected for by-passing a controlled portion of the effluent gas around said rotary heat transfer elements.

5. In a catalytic reactor, a housing adapted to contain a catalyst bed of foraminous material disposed in one end portion of said housing, a partitioning element, said partitioning element and bed subdividing the said end portion of said housing into relatively cold gas influent and relatively hot effluent ducts to said bed, a heat exchanger for close control of temperatures developed in said bed mounted in the opposite end portion to rotate in said housing with heat exchange elements radially passing in rotation from the effluent section to the influent section whereby to transfer heat from effluent gases to influent gases, a by-pass duct communicating with the effluent duct leading gases around said heat exchanger, electrically actuated valve means in said by-pass duct, electrical heater elements in the influent duct, electrical control elements sensitive to the temperature of said bed adapted to inactivate said electrical heater elements and actuate said valve means to by-pass a controlled quantity of hot effluent gases around said heat exchanger and means for impelling gas flow into and out of said reactor.

6. Apparatus as defined in claim 4 wherein the effluent gases are further cooled in contact with a refrigerated heat exchange surface.

7. A catalytic reactor comprising an annular casing adapted to contain a catalyst bed comprising catalytic foraminous material mounted in one end radially dividing a lower portion of the said casing into relatively cold inlet and hot outlet sections, a heat exchanger for close control of temperatures developed in said bed mounted to rotate in said casing coaxially above said bed with the heat exchange elements intercepting both the said cold inlet and hot outlet sections, partitioning means above said heat exchanger in the plane of said bed, dividing the upper portion of said casing into inlet and outlet sections, and means to pass inlet gas to the upper inlet section, means to conduct effluent gas away from the upper outlet section of said casing and means to rotate said heat exchanger.

8. Apparatus as defined in claim 7 in combination with means for dehumidifying the gas passed into said catalytic unit.

9. Apparatus as defined in claim 7 in combination with a dehumidifier and duct means interconnecting effluent gas from said bed with said dehumidifier to further dehumidify the effluent gas.

10. Apparatus as defined in claim 7 wherein the rotary heat exchange elements comprise a granular desiccant bed.

11. Apparatus as defined in claim 7 wherein the rotary heat exchange elements comprise a foraminous metal body upon which is supported a granular desiccant bed for rotation therewith.

12. A catalytic reactor adapted to contain a catalyst bed at one end interposed between a separate relatively cold gas influent section and a hot gas effluent section, a heat exchanger mounted above said bed to rotate and to intercept gas flowing through both said influent and effluent sections and exchange heat therebetween, said rotary heat exchanger comprising foraminous heat conducting elements and a bed of granular desiccant material through which influent and effluent gases may pass, whereby hot effluent gases pass in contact with said heat exchanger and bed in said effluent section, heating the foraminous exchanger elements and bed to vaporize moisture adsorbed therein, and in continuous rotation, intercept, adsorb moisture and heat influent gas in contact with said adsorbent bed and hot heat exchange elements in said influent section, and means for impelling gas passage through said catalytic reactor.

13. In a catalyst reactor, a cylindrical housing, a gas permeable bed of catalytic contact material disposed in the lower end of said housing diametrically dividing said housing as a partitioning wall into influent and effluent chambers, electrical heater elements in the influent portion, a heat exchanger mounted above said bed to rotate about a vertical axis concentric with said cylindrical housing to intercept gas passing through both influent and effluent chambers, partitioning elements subdividing said housing above and below said rotary heat exchanger continuing the division of said housing into its influent and effluent chambers, a by-pass duct communicating with said effluent chamber leading gas around said rotary heat exchanger whereby a portion of effluent gas from said catalyst bed may pass through said heat exchanger and a portion through said by-pass duct, at least one electrically actuated valve in said by-pass duct controlling the flow of gas therethrough, electrical sensing means responsive to the temperature of said bed in circuit with each valve and with said electrical heating elements whereby the quantity of gas flow through said by-pass duct, as controlled by said valves and the heat supplied by said electrical heating elements are responsive to the temperature of said bed.

14. Apparatus as defined in claim 13 wherein there are a plurality of electrically actuated valves in said by-pass each having means sensitive to a different temperature of said bed to actuate the same from closed to open position whereby to by-pass progressively variable quantities of effluent gas responsive to a selected temperature of said bed.

15. The method of controlling the temperature of a catalyst bed comprising partially heating influent gaseous reagents passed to said bed in heat exchange with effluent gaseous reaction products withdrawn after reactive contact with said bed, further heating the influent gas to said bed by heat supplied only extraneously of heat exchange between said catalyst bed and gases in said system, controlling the temperature of said bed by by-passing a controlled quantity of effluent gases of said reaction from heat exchange with the influent gas and simultaneously terminating supply of extraneously supplied heat to the influent gas responsive to the approximate temperature of said bed.

16. The method as defined in claim 15 wherein the gas passing to said bed is first dehumidified.

17. The method as defined in claim 15 wherein the gaseous reagents passing to said bed is simultaneously both preheated in heat exchange with effluent gaseous reaction product and dehumidified prior to passing to said bed.

18. The method of controlling the temperature of a catalyst bed disposed in a foraminous catalyst body having opposite inlet and outlet gas contacting surfaces, said foraminous body normally tending to rise by exothermic heat of gaseous reactants in contact therewith, comprising passing exothermically reactable gases into one side of said bed and removing the hot effluent reaction product gases from the opposite side of said bed, while conducting the inlet and outlet gases to and from said bed in neighboring streams, rotating heat exchange elements between said gaseous inlet and outlet streams whereby to preheat the incoming gas while cooling the effluent gas in the heat exchange, said rotating exchanger contact with the inlet gas comprising the sole source of exchange heat in said gas before the gas enters into catalytic contact with the bed, and controllably applying additional heat extraneously of heat available from said bed to the inlet gas, as needed for control of the temperature of said catalyst bed.

19. A method of controlling the temperature of a catalyst bed comprising partially heating an influent gas stream passed to said bed in heat exchange with an effluent gas stream withdrawn after reactive contact with said bed, further heating the influent gas stream only by heat supplied extraneous of heat exchange between said catalyst bed and said influent gas stream, controlling the temperature of said bed by terminating the supply of extraneously supplied heat to the influent gas stream in response to a first predetermined temperature within said bed and further by by-passing a controlled quantity of one of said gas streams from heat exchange with the other of said gas streams when the temperature of said bed reaches a second predetermined temperature.

20. A method of controlling the temperature of a catalyst bed comprising partially heating an influent gas stream passed to said bed in heat exchange with an effluent gas stream withdrawn after reactive contact with said bed, further heating the influent gas stream only by heat supplied extraneous of heat exchange between said catalyst bed and said influent gas stream, controlling the temperature of said bed by terminating the supply of extraneously supplied heat to the influent gas stream in response to a first predetermined temperature within said bed and further by by-passing a controlled quantity of one of said gas streams from heat exchange with the other of said gas streams when the temperature of said bed reaches a second predetermined temperature, and thereafter terminating by-pass when the temperature of said bed decreases to said second predetermined temperature and resupplying said extraneously supplied heat to said influent gas stream when the temperature of said bed decreases to said first predetermined temperature.

References Cited by the Examiner

UNITED STATES PATENTS

| | | | |
|---|---|---|---|
| 1,716,481 | 6/26 | Bilsky | 23—212 |
| 2,320,911 | 6/43 | Cooper | 262—6 |
| 2,538,738 | 3/51 | Stengle | 23—288 |
| 2,680,008 | 6/54 | Karlsson | 257—268 |
| 2,723,837 | 11/55 | Pennington | 257—267 |
| 2,792,071 | 5/57 | Pennington | 252—6 |
| 2,809,811 | 10/57 | Blomquist | 252—267 |
| 2,843,217 | 7/58 | Von Linde | 252—267 |
| 2,887,365 | 5/59 | De Rycker | 252—288.91 |

FOREIGN PATENTS 360,024 11/31 Great Britain.

MAURICE A. BRINDISI, *Primary Examiner*.